(12) United States Patent
Vietzke (10) Patent No.: US 11,626,733 B2
(45) Date of Patent: Apr. 11, 2023

(54) METHOD AND SYSTEM FOR DETERMINING AND CONTROLLING AN ELECTRICITY FEED TO AN ELECTRICITY GRID FROM A LOAD SIDE OF AN ELECTRIC CIRCUIT

(71) Applicant: INDIELUX UG (HAFTUNGSBESCHRÄNKT), Berlin (DE)

(72) Inventor: Marcus Vietzke, Berlin (DE)

( * ) Notice: Subject to any disclaimer, the term of this patent is extended or adjusted under 35 U.S.C. 154(b) by 5 days.

(21) Appl. No.: 16/650,953

(22) PCT Filed: Sep. 27, 2018

(86) PCT No.: PCT/EP2018/076278
§ 371 (c)(1),
(2) Date: Mar. 26, 2020

(87) PCT Pub. No.: WO2019/063701
PCT Pub. Date: Apr. 4, 2019

(65) Prior Publication Data
US 2020/0259328 A1  Aug. 13, 2020

(30) Foreign Application Priority Data

Sep. 27, 2017 (EP) ..................................... 17193588

(51) Int. Cl.
*H02J 3/14* (2006.01)
(52) U.S. Cl.
CPC ..................... *H02J 3/14* (2013.01)

(58) Field of Classification Search
CPC ...... H02J 3/14; H02J 3/38; H02J 3/382; H02J 3/383; H02J 2310/14; H02J 2310/62; H02J 7/00309; H02J 7/007192; Y02B 70/30; Y02B 70/3225; Y04S 20/242; Y04S 20/222; H02M 1/327
See application file for complete search history.

(56) References Cited

U.S. PATENT DOCUMENTS

| | | | | |
|---|---|---|---|---|
| 9,811,064 | B2* | 11/2017 | Carlson | H02J 3/381 |
| 10,700,527 | B2* | 6/2020 | Kobayashi | H02J 9/06 |
| 2009/0302681 | A1* | 12/2009 | Yamada | H02J 3/381 |
| | | | | 307/46 |
| 2011/0278930 | A1* | 11/2011 | Yasutomi | H02J 3/32 |
| | | | | 307/65 |
| 2012/0321977 | A1* | 12/2012 | Katou | H01M 8/04955 |
| | | | | 429/429 |

(Continued)

FOREIGN PATENT DOCUMENTS

| | | |
|---|---|---|
| EP | 1986306 | 10/2008 |
| WO | 2015116002 | 8/2015 |

*Primary Examiner* — M. N. Von Buhr
(74) *Attorney, Agent, or Firm* — JMB Davis Ben-David (57) ABSTRACT

The invention relates to a method for controlling an electricity feed to an electricity grid (12) from a load side of an electric circuit (5), comprising the steps of: a) Providing a electricity feed with an associated feed duration to a controller (13) of an electric power converter (7); b) The controller (13) commissioning the electric power converter (7) to provide the electricity feed, until the electricity feed and feed duration is provided anew or until the feed duration expires. The invention further relates to a system for controlling an electricity feed of an electric source.

14 Claims, 3 Drawing Sheets

(56) References Cited

U.S. PATENT DOCUMENTS

| | | | | |
|---|---|---|---|---|
| 2014/0032009 | A1* | 1/2014 | Kussyk | H02J 13/00007 |
| | | | | 700/297 |
| 2015/0029631 | A1* | 1/2015 | Nakamura | H02J 7/0031 |
| | | | | 361/103 |
| 2016/0216298 | A1* | 7/2016 | Campeanu | G01R 21/002 |
| 2017/0117595 | A1* | 4/2017 | Hase | G01R 31/371 |
| 2017/0148280 | A1* | 5/2017 | DeSalle | H04M 11/04 |
| 2017/0366092 | A1* | 12/2017 | Langeslag | H02M 3/33523 |
| 2018/0136685 | A1* | 5/2018 | Yun | G01R 27/02 |
| 2018/0312124 | A1* | 11/2018 | Hyden | H02J 7/1423 |

\* cited by examiner

METHOD AND SYSTEM FOR DETERMINING AND CONTROLLING AN ELECTRICITY FEED TO AN ELECTRICITY GRID FROM A LOAD SIDE OF AN ELECTRIC CIRCUIT

CROSS-REFERENCE TO RELATED APPLICATIONS

This is the U.S. National Stage of International Patent Application No. PCT/EP2018/076278 filed on Sep. 27, 2018, which in turn claims the benefit of European Patent Application No. 17193588.5 filed on Sep. 27, 2017.

The invention relates to a method and a system for determining and controlling an electricity feed to an electricity grid from a load side of an electric circuit.

As renewable energies such as solar modules become more and more popular, many households have transformed from a purely electricity consuming to an electricity producing entity, particularly feeding electricity into the public electricity grid.

Electricity sources for such electricity feeds can be electricity generating sources such as photovoltaic modules, wind turbines or other, renewable energy sources. But also electricity sources such as electricity storages like batteries can feed electricity into the electric circuit.

These local electricity sources are usually connected to a fixed and permanent home or house connection. Due to safety concerns the electric source are usually not connected to the electric circuit of the specific household for example by the available power sockets. However, each electric circuit has specific wire cross-sections, thermal isolation properties of the walls, wire contacts and at least one fuse that are designed for a specific, maximum electricity load.

Each component of the electric circuit has an associated electric reserve, wherein said reserve determines a maximum current allowable through the component without the component exceeding a predefined temperature, e.g. 70° C. for PVC insulated wires.

The single electric reserves of the components define an electric reserve of the electric circuit.

In case not only electricity consuming appliances are connected to the electric circuit but also electricity sources, special attention has to be paid that the electric circuit does not overheat due to an potential overload of the electricity circuit.

In order to avoid an overload of the electric circuit, the maximum electricity feed in electricity sources adapted for household use is by default limited to a minimal electric circuit reserve according to generally recognized rules of the technology. These rules however differ for different countries.

If higher electricity feeds into the electric circuit are wanted, an electrician can determine a permanent electric circuit reserve of the specific electric circuit. The permanent electric reserve is supposedly higher than the minimum electric circuit reserve and it is determined in accordance with the rules and regulations according to DIN VDE 0298-4, HD 384.5.523 S2 or IEC 60364-5-523.

The determination of the permanent electric circuit reserve can for example be executed by a system comprising a controllable electricity source and a computer that is configured to control the electricity source. When commissioning the system, certain installation parameters have to be determined. The installation parameters are for example the type of the walls within which the electric circuit is arranged, the kind of fuse of the electric circuit, the number of circuits, and/or the nominal current of the fuse.

The computer determines from the installation parameters and in accordance to the above-mentioned rules and regulations the permanent circuit reserve.

During operation, the computer controls the electricity source and limits its electricity feed to the electric circuit so that the permanent circuit reserve is never exceeded.

However, the electricity generation of many electricity sources can exceed the minimal and also the permanent circuit reserve. Therefore, the generated electricity cannot be fed into the grid but has to be used locally e.g. for heating water (and thus be transformed in a low energy form) or has to be stored in a separate electricity storage.

It is an obvious disadvantage that the electricity feed is kept most of the time lower than it could be, as the times during which a maximum load provided by the electric circuit are usually very short or maximum load is hardly met.

Nonetheless, safety concerns have to be vigilantly observed, when trying to increase the electricity feed beyond the permanent reserve. For example, while it is possible to increase the electricity fee above the permanent reserve temporally, it is important to have fail-safe mechanisms in place, so that such a system would in no event lead to an overheating of the electric circuit.

Systems known in the state of the art do not provide such fail-safe mechanisms.

While there are controllers for controlling the electricity feed of an inverter of an electric source, these controllers are operated externally, with start and stop signals. In case the stop signal is for some catastrophic reason not provided to the controller (e.g. the external stop-signal provider fails), the electricity feed would permanently exceed the permanent reserve causing fire or other leading to other fatal consequences.

An object of the invention is therefore to overcome the drawbacks of the limited electric circuit reserves.

The problem according to the invention is solved by a method for determining and controlling an electricity feed to an electricity grid from a load side of an electric circuit according to claim 1 and a system according to claim 11.

Advantageous embodiments are described in the sub-claims.

According to claim 1, a method for controlling an electricity feed to an electricity grid from a load side of an electric circuit, comprises the steps of:
a) Providing an information on particularly a magnitude, such as a electric current and or voltage, of an electricity feed with an associated feed duration to a controller of an electric power converter;
b) The controller commissioning the electric power converter to provide the electricity feed determined from the information on the electricity feed, or to feed the electricity feed into the electric circuit, until the information on the electricity feed and the associated feed duration is provided anew or until the lastly provided feed duration expires.

This way a fail-safe operation of electricity feed is achieved, as with the provision of an electricity feed an associated time interval is provided after which the method according to the invention can switch to a different, particularly predefined magnitude of electricity feed, such as for example zero Ampere or to a minimum electricity feed.

Particularly due to this mechanism, the method according to the invention is operational safe, as particularly with each start of an electricity feed an associated end time is provided at the same time. Therefore, it is not possible that only a start signal is provided and an end signal is not.

The controller is particularly integrated with the electric power converter, while the electric power converter is particularly connected to or comprised by an electric source.

An electric power converter is particularly an electrical or electro-mechanical device for converting electrical energy. An electric power converter can for example be a transformer configured to change the voltage of AC power, or to transform an AC voltage to a DC voltage or vice versa, but also includes far more complex systems. The term electric power converter can also refer to a class of electrical machinery that is used to convert one frequency of alternating current into another frequency.

Furthermore, the term electric power converter particularly refers to an inverter (DC-to-AC or AC-to-DC converter) or an AC-to-AC or DC-to-DC converter.

According to an embodiment of the invention, the electric power converter comprises an inverter or is an inverter.

According to an embodiment of the invention the method comprises the steps of:

Determining at least one installation parameter of the electric circuit;

Determining repeatedly, intermittently or continuously an electricity load on the load side of the electric circuit, wherein each time the electricity load is determined, the following steps are executed:
  i) Determining, particularly with a computer, the information on the electricity feed and the feed duration, wherein the electricity feed and the feed duration are determined from the at least one installation parameter and the electricity load,
    wherein the electricity feed and the electricity feed duration are determined such from the at least one installation parameter and the electricity load that a temperature of particularly the wires of the electric circuit remains below a predefined maximum temperature during the electricity feed duration, particularly independent of a potential increase of the electricity load during the feed duration;
  ii) Step a) as described above, namely providing the information on particularly the magnitude of the electricity feed with the associated feed duration to the controller of the electric power converter;
  iii) Step b) as described above, namely the controller commissioning the electric power converter to provide the electricity feed determined from the information on the electricity feed, or to feed the electricity feed into the electric circuit, until the information on the electricity feed and the associated feed duration is provided anew or until the lastly provided feed duration expires.

Steps ii) and iii) are identical to the steps a) and b) of claim 1, as they indicate where and when the method steps a) and b) from claim 1 are to be executed according this embodiment.

The electricity grid and the electric circuit are particularly based on an alternating current system particularly with a frequency of 50 Hz to 60 Hz. As many electricity sources such as for example solar modules produce a continuous current, the electric sources often are combined with an electric power converter that converts the continuous current in an alternating current. In the context of the invention an electric source is an electric source that is configured to be connected to the alternating current electric circuit. Therefore, the electric power converter is understood to be comprised in the electricity source, in case an electric power converter is required.

Furthermore, electricity refers to an electric power or an electric current. Electric power and current are related via the electric voltage and by a phase between the voltage and the electric current.

The at least one installation parameter of the electric circuit is for example an information that relates particularly to an assembly and installation situation and/or to a specification of a component of the electric circuit.

The installation parameter can be expressed in a numeric value but it can also be a categorical information, such as for example a kind of wall within which the wires of the electric circuit are arranged. The categorical information can be transformed in a numeric value that for example accounts for a heat dissipation derived from e.g. a specific thermal insulation associated to a certain kind of wall.

The heat dissipation in turn can influence the electric circuit reserve. The better the heat dissipation properties of the wires of the electric circuit, the longer it will take to reach the predefined maximum temperature.

The electric circuit reserve is related to the maximum predefined temperature, as the circuit reserve is determined by the current or power that can be transported, i.e. fed in or provided by the electric circuit, without the circuit being heated up above said maximum temperature.

The maximum temperature is particularly 70° C. for PVC insulated wires.

An electric reserve is particularly given in units of electric current, i.e. particularly in Ampere.

The permanent electric circuit reserve is the reserve that is permanently available to an electricity feed. The permanent reserve is particularly determined from an additional reserve of the wires, the reserve of the contact points of the wires to other components and the nominal current of the fuse.

For example, if the fuse has a nominal current of 16 Ampere, and the wires have a reserve of 22 Ampere and the contact points a reserve of 24 Ampere, than the permanent reserve can be determined by:

$$I_{permanent} = \min(I_{wire}, I_{contact}) - I_{fuse}$$

which would yield 6 Ampere that could be fed into the electric circuit, without the circuit ever being heated up above the predefined temperature, even if on the load side of the electric circuit an electric load of the nominal current of the fuse would be consumed simultaneously.

In case the electricity load is be lower than the nominal current of the fuse, correspondingly more electricity could be fed into the electric circuit. This reserve, however, is not the permanent reserve, but is only a temporary reserve that varies with the electricity load.

The method according to the invention, allows for the use of this temporary reserve, by determining an electric load of the electric circuit. Based on the electricity load, an electric feed that is particularly a maximum electric feed for the given electricity load is determined according to the invention.

As the electricity load can change with time, the electricity load is estimated repeatedly. Each time the electricity load is determined, the electricity feed is potentially adjusted to a new value in order to meet the electric circuit reserve, i.e. the temperature limit given by the predefined maximum temperature.

The invention ensures that even if the electricity load is determined sporadically only, with unknown time intervals between the electricity load readings or measurements, the predefined maximum temperature is never exceeded.

This is particularly achieved by a reduction of the electricity feed after expiration of the feed duration associated to the electricity feed, particularly wherein the electricity feed is reduced to meet the permanent electric circuit reserve (if known), down to the default electricity feed according to generally recognized rules of the technology, or even zero Ampere.

This way, it is ensured that even if a signal providing instance, i.e. an external computer, is not providing signals anymore, the controller will commission the electric power converter of the electric source to switch back to a safe operation mode after the determined feed duration has expired.

According to an embodiment of the invention, the at least one installation parameter is one of:
  a nominal current for a fuse protecting the final circuit, particularly in units of Ampere,
  a maximum contact load, particularly in units of Ampere,
  a maximum wire load, particularly in units of Ampere,
  a type of wall of the facility comprising the electric circuit, particularly a dry wall, a wood wall, a brickwork wall, or a concrete wall,
  a kind of fuse, particularly a screw-type fuse or a circuit breaker, and or
  a number of fuses for the electric circuit.

As explained above, from the wire load, the contact load and the nominal fuse current a permanent reserve can be estimated.

From the installation parameters "a kind of wall", and "a kind of fuse" other characteristics of the electric circuit can be determined, such as for example the heat dissipation properties of the electric circuit.

According to another embodiment of the invention, in case the feed duration has expired, the electricity feed is reduced to a minimum electricity feed, particularly determined from the at least one installation parameter.

The minimum electricity feed can be an electricity feed that is in accordance with the generally recognized rules of the technology, the permanent circuit reserve current, or zero Ampere.

This embodiment allows for a failsafe operation of the electric source and the associated electricity feed.

According to another embodiment of the invention, a temperature is determined repeatedly or continuously, wherein the electricity feed and the feed duration is additionally determined from the temperature, i.e. particularly for the determination of the electricity feed and the feed duration, the temperature is used as an additional input parameter, refining the electricity feed and duration.

This embodiment allows for a more accurate determination of the state of the electric circuit. Therefore, a potentially higher electricity feed becomes possible, as otherwise, i.e. if the temperature is not known, more conservative assumptions have to be made regarding the state of the electric circus and consequently, a lower electricity feed is allowable.

The electricity feed is particularly not determined alternatively to the determination based on the electricity load but the temperature is used as an additional parameter for determining the electricity feed and the associated duration with the electricity load and the installation parameters.

According to another embodiment of the invention, the temperature is an electric circuit temperature, particularly wherein the electric circuit temperature is estimated recursively from a surrounding temperature of the electric circuit, the electricity load on the load side of the electric circuit, the currently fed electricity feed e.g. a maximum, a minimum, or zero feed and the at least one installation parameter.

As the surrounding temperature, such as for example the room temperature can be estimated with a temperature sensor, this embodiment allows for the determination of the electric circuit's temperature by a temperature measurement of the surrounding.

In case the surrounding temperature is not known, the surrounding temperature can be estimated to 25° C. This temperature also depends on the national requirements.

According to another embodiment of the invention, the electricity load is estimated as a current load or a power load, wherein the current load is particularly determined from a power load, particularly from an apparent power load, particularly assuming a phase angle $\alpha$ between electric current and electric voltage such that the phase angle is within the provisions of national requirements, wherein particularly $|\cos(\alpha)| \geq 0.8$ and the electric voltage is not higher than a minimal predefined voltage, wherein the minimal predefined voltage is particularly 207 V.

For example, the phase angle of 37° leads to cos(37°) =0.8. The vast majority of electric appliances meet this criterion of a maximum phase shift, i.e. they exhibit a lower phase shift, such that a maximum apparent power can be derived assuming this value.

Based on this value the maximal possible apparent power can be calculated in case only the effective power is provided as an electricity load. From the apparent power, the electric current load can be derived with the minimal possible voltage, the electric circuit reserves can be determined.

For the person skilled in the art the equivalence of electric (AC-) power and electric current are known. Therefore, the method can be executed equivalently based on electric power values or electric current values. Therefore, particularly the more general term "electricity" is used in order to refer to both; the electric power and the electric current.

According to another embodiment of the invention, the electricity load is determined for particularly sporadic elapsed time intervals, wherein within each elapsed time interval of the elapsed time intervals a predefined amount of electricity has been supplied to the load side of the electric circuit, wherein at the end of each time interval the electricity load is determined particularly from a signal issued after each elapsed time interval, particularly wherein the determined electricity load is the predefined electricity load.

This embodiment allows for the use of the method with mains connection meters that comprise a turning wheel or a S0 interface for indicating and determining the electric current provided to the load side of the electric circuit. A single turn of the wheel of such a meter corresponds to a predefined amount of electricity provided to the load side. As the electricity load can vary with time, the turning speed of the wheel varies and therefore the time intervals for the turns vary. This leads to a sporadic determination of the electricity load on the electric circuit.

According to another embodiment of the invention, the electricity load is determined for elapsed time intervals, wherein the time intervals are particularly spaced regularly and the electricity load is determined at the end of each time interval, wherein the electricity load is particularly determined from a mains connection meter reading and/or from a mains connection measurement with a current clamp.

This embodiment allows for the use of the method with other mains connection meters or for the use with a dedicated measurement device on the electric circuit.

Modern and smart-meters provide readings of the electricity load in regular intervals for example via a computer network like the internet, or by direct connection with the smart meter. This embodiment particularly allows the use of the method with these kinds of meters and current clamps.

Particularly when the electricity load exceeds 3 Ampere (or 700 W) the determination of the electricity load should be carried out in a redundant way, i.e. the electricity load should be determined from a mains connection meter reading and from a mains connection measurement with a current clamp.

According to another embodiment of the invention, the electricity feed is estimated according to $$I_{max\_feed} = \min(I_{fuse} * F1, I_{contact}) - I_{load} \quad [\text{Eq. 1}]$$

and the feed duration is estimated according to $$t_{max\_feed} = F2 * (I_{max\_feed}/I_0)^{F3}, \quad [\text{Eq. 2}]$$

wherein
- $I_{max\_feed}$ is the determined electricity feed, particularly in units of Ampere,
- $I_{fuse}$ is the nominal current for the fuse, particularly in units of Ampere,
- $I_{load}$ is the estimated electricity load, particularly in units of Ampere,
- $I_0$ corresponds to unity electricity, particularly equaling 1 Ampere,
- F1 is a first weighting factor, particularly wherein F1 equals particularly 1.13,
- F2 is a characteristic time, particularly 606.5 seconds,
- F3 an exponent, particularly equal to −1.783.

This embodiment allows for the determination of the electricity feed and the associated feed duration without the determination of the temperature.

Each time a new electricity load is estimated, the electricity feed can be calculated according to equation Eq. 1 and the associated feed duration according to equation Eq. 2. The updated electricity feed and associated feed duration are then particularly transmitted to the electric source and the electric source is allowed to provide the determined electricity feed for the determined feed duration.

According to another embodiment of the invention, the electricity feed is estimated according to, $$I_{max\_feed} = I_0 * ((((T_{max} - T_n)/(1 - \exp(-F5/tau)) + T_n) - T_{room})/A)^{(1/B)} - I_{load} \quad [\text{Eq. 3}]$$

and the feed duration is estimated according to $$t_{max\_feed} = -tau * \ln(1°\text{ C.} - (T_{max} - T_n)/((T_{room} + A*((I_{max\_feed} + I_{fuse} * F4)/I_0)^B) - T_n)), \quad [\text{Eq. 4}]$$

wherein
- $I_{max\_feed}$ is the electricity feed, particularly in units of Ampere,
- $I_{load}$ is the estimated electricity load, particularly in Ampere,
- $I_0$ corresponds to unity electricity, particularly equaling 1 Ampere,
- $T_{max}$ is the predefined maximum Temperature, particularly 70 degrees Celsius,
- $T_n$ is the temperature of the electric circuit particularly during the elapsed time interval,
- tau is a characteristic heat dissipation time, particularly wherein the characteristic dissipation time depends on the at least one installation parameter, particularly on the type of wall,
- A is a weighting factor in units of degree Celsius, wherein A equals particularly 0.0615.
- B is a dimensionless exponent, wherein B equals particularly 2.3347.
- F4 is a second weighting factor, particularly wherein F4 equals 1.45,
- F5 is a second exponential factor, particularly wherein F5 equals 1 second or is the duration of the elapsed time interval.

This embodiment allows for the determination of the electricity feed and the associated feed duration, when the temperature, particularly temperature of the electric circuit is available.

According to another embodiment of the invention, the temperature, particularly the temperature of the electric circuit is estimated according to $$T_{n+1} = T_n + ((T_{room} + A*((I_{present\_feed} + I_{load})/I_0)^B) - T_n) * (1 - e^{(-1s/tau)}) \quad [\text{Eq. 5}]$$

wherein
- $T_{n+1}$ is a present electric circuit temperature,
- $T_{room}$ is the surrounding temperature,
- $I_{present\_feed}$ is the present electricity feed.
- A and B are the same as in equations Eq. 3 and Eq. 4.

According to another aspect of the invention a computer program comprising computer program code for determining and controlling an electricity feed to an electricity grid from a load side of a final electric circuit, executes the method according to the invention, when the computer program is executed on a computer.

The problem according to the invention is furthermore solved by a system for controlling an electricity feed of an electric source comprising:
- particularly an electric source connected to or comprising an electric power converter;
- a controller, for controlling an electricity feed from the electric power converter to an electricity circuit;
- the controller comprising a data storage and a timer;
- wherein the controller is configured to repeatedly receive an information on an electricity feed and an associated feed duration and store the information on the data storage;
- wherein the controller is further configured to commission the electric power converter to provide the electricity feed determined from the information on the electricity feed to an electric circuit and to autonomously end the electricity feed in case the feed duration is expired, particularly independently of an external stop-signal provider, wherein the stop-signal provider is particularly a computer.

The controller can furthermore be configured to check validate the received information such that a corruption of the information is excluded. The validation can for example be checksum based, i.e. the information is associated to a checksum that has to be validate by the controller.

The term "autonomously", refers to the property that the controller is configured to end the electricity feed in absence of any further signals received particularly form the computer.

The system according to the invention, allows for a fail-safe electricity feed to an electric circuit with increased electricity provided to the electric circuit as compared to the state of the art.

According to another embodiment of the invention, the controller and the electric power converter comprise a housing and wherein the controller is comprised in the housing of the electric power converter.

This embodiment allows for the facile installation of the system.

According to another aspect of the invention a system for determining and controlling an electricity feed to an electricity grid from a load side of a final electric circuit, comprises the components:

An electric circuit with a fuse;
An electricity source connected to the electric power converter, wherein the electric power converter is connected to a load side of the electric circuit that is secured by the fuse;
An electric load sensor arranged for estimating an electricity load of the electric circuit;
A computer, arranged particularly outside the housing of the electric power converter;

wherein the computer is connected to the electricity load sensor and the controller of the electric power converter, wherein the computer is configured to:

i) determine an electricity load on the electric circuit from data provided by the electricity load sensor;
ii) determine the electricity feed and the feed duration from the determined electricity load;
iii) provide the information on the electricity feed and the feed duration to the controller;

wherein the system is configured to execute the method according to the invention.

Such a system allows for the provision of a particularly maximum electricity feed to the electric circuit while observing the predefined maximum temperature of the electric circuit, i.e. the electric circuit reserves.

The system according to this embodiment allows to execute the method according to the invention, particularly provided that the installation parameter is the fuse and the controller executes the commands commissioned and received form the computer. According to the another embodiment of the invention, the electricity feed information and the feed duration are determined such by the computer from the fuse or/and another installation parameter and the electricity load that a temperature of the electric circuit remains below a predefined maximum temperature during the electricity feed duration.

The predefined maximum temperature can be provided, estimated by the computer and/or stored on the computer.

According to another embodiment of the invention, the electricity load sensor is a current clamp.

The current clamp allows for the determination of the electricity load in regular time intervals and it can be installed at the electric circuit at variable positions. This embodiment provides flexibility in terms of arrangement of the electricity load sensor.

According to another embodiment of the invention, the electricity load sensor is arranged at or in a mains connection meter, wherein the electricity load sensor either provides a power reading of the reactive or the apparent power of the connection meter, or wherein the sensor provides a signal each time a predefined amount of electricity has been provided to the load side of the electric circuit.

This embodiment of the system allows for the adaption to almost any given installation situation of the electric circuit in the household or the facility.

According to another embodiment of the system, the system comprises a temperature sensor arranged for measuring the surrounding temperature of the electric circuit, wherein the temperature sensor is connected to the computer, such that the computer is provided with the estimated surrounding temperature data.

The computer is configured to particularly calculate the electricity feed and the associated feed duration, particularly according to equation Eq. 3 and Eq. 4. The temperature of the electric circuit can be computed according to Eq. 5 recursively, every time a new temperature and a new electricity load are determined.

The terms 'computer' or 'processor', or system thereof, are used herein as ordinary context of the art, such as a general purpose processor or a micro-processor, RISC processor, or DSP, possibly comprising additional elements such as memory or communication ports. Optionally or additionally, the terms 'processor' or 'computer' or derivatives thereof denote an apparatus that is capable of carrying out a provided or an incorporated program and/or is capable of controlling and/or accessing data storage apparatus and/or other apparatus such as input and output ports. The terms 'processor' or 'computer' denote also a plurality of processors or computers connected, and/or linked and/or otherwise communicating, possibly sharing one or more other resources such as a memory.

The terms 'software', 'program' or 'code' may be used interchangeably according to the context thereof, and denote one or more instructions or directives or circuitry for performing a sequence of operations that generally represent an algorithm and/or other process or method. The program is stored in or on a medium such as RAM, ROM, or disk, or embedded in a circuitry accessible and executable by an apparatus such as a processor a computer or other circuitry.

The processor and program may constitute the same apparatus, at least partially, such as an array of electronic gates, such as FPGA or ASIC, designed to perform a programmed sequence of operations, optionally comprising or linked with a processor or other circuitry.

As used herein, without limiting, a module represents a part of a system, such as a part of a program operating or interacting with one or more other parts on the same unit or on a different unit, or an electronic component or assembly for interacting with one or more other components.

Furthermore, as used herein, without limiting, a process represents a collection of operations for achieving a certain objective or an outcome.

The term 'configuring' and/or 'adapting' for an objective, or a variation thereof, implies using at least a software and/or electronic circuit and/or auxiliary apparatus designed and/or implemented and/or operable or operative to achieve the objective.

A device storing and/or comprising a program and/or data constitutes an article of manufacture. Unless otherwise specified, the program and/or data are stored in or on a non-transitory medium.

In the context of embodiments of the present disclosure, by way of example and without limiting, terms such as 'operating' or 'executing' imply also capabilities, such as 'operable' or 'executable', respectively.

Further features and advantages of the invention shall be described by means of a detailed description of embodiments with reference to the figures. It is shown in FIG. 1 a schematic drawing of an electric circuit with a first embodiment of the system according to the invention.

Figure 1:
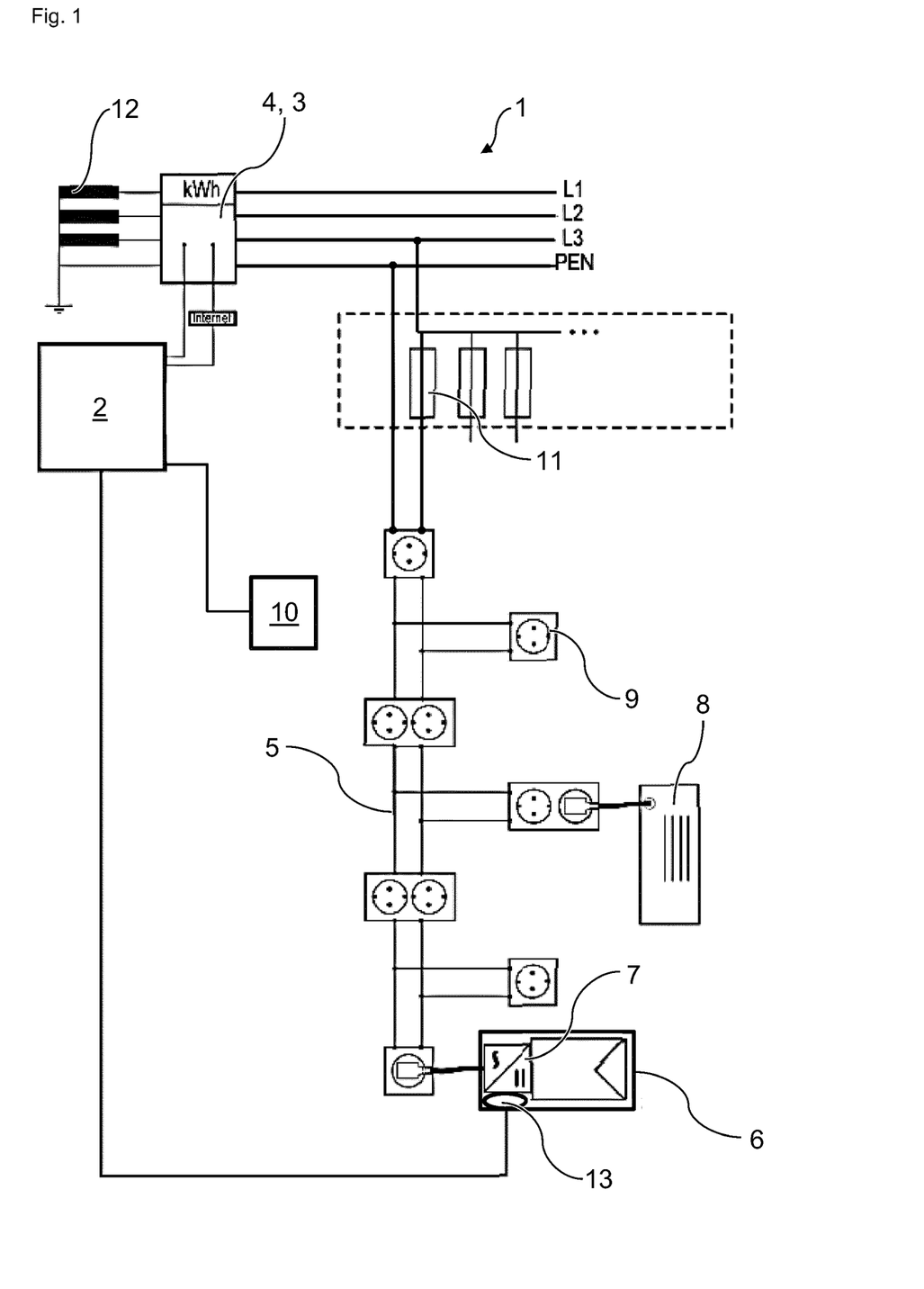
Figure 2:
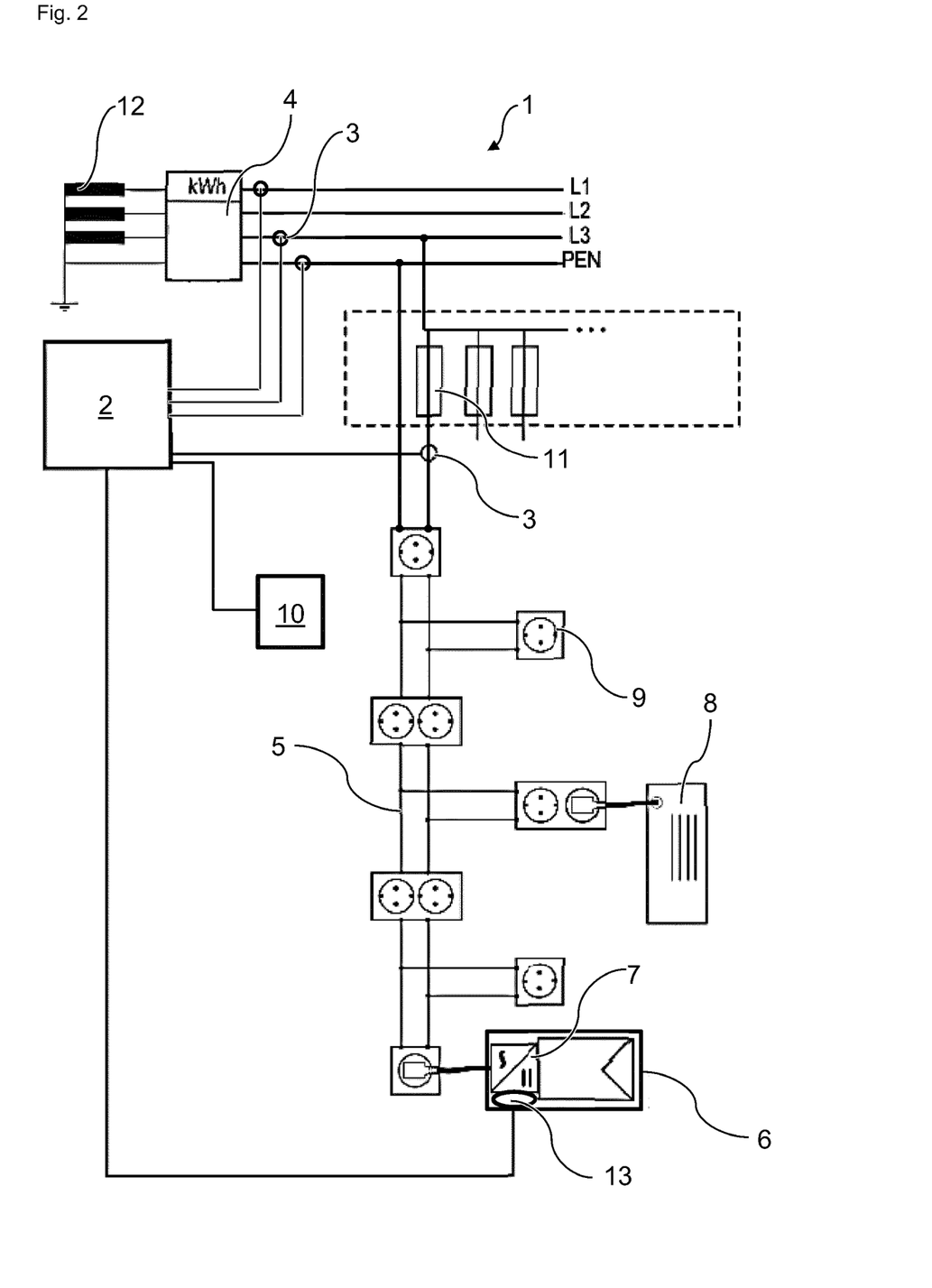
FIG. 2 a schematic drawing of an electric circuit with a second embodiment of the system according to the invention.
Figure 3:
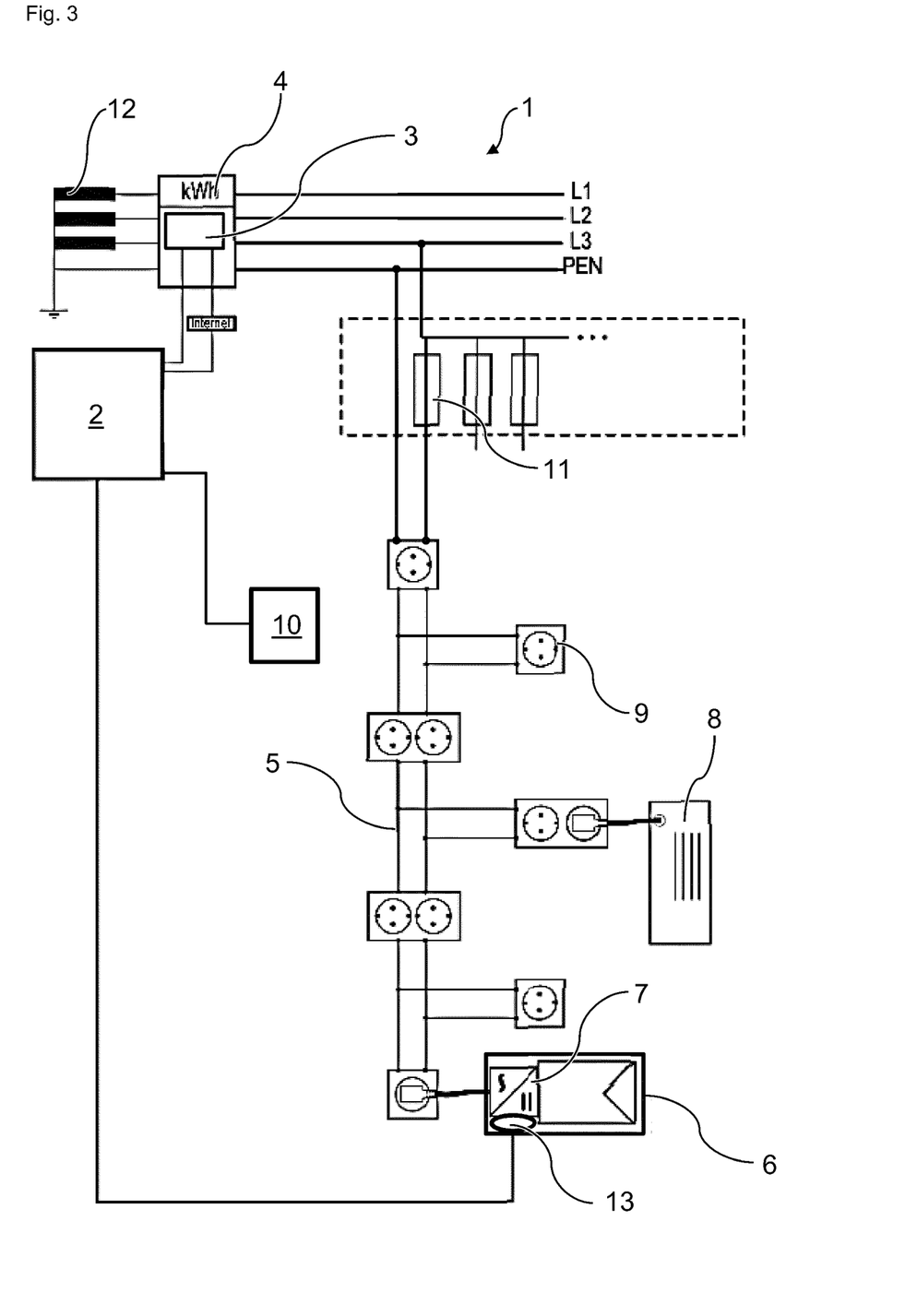
FIG. 3 a schematic drawing of an electric circuit with a third embodiment of the system according to the invention.

In FIG. 1, FIG. 2 and FIG. 3 a system 1 according to the invention is shown. The system 1 comprises an electric circuit 5 with a plurality of power sockets 9. In one of the power sockets 9 a power consuming appliance 8 is plugged in. An electricity source 6 is connected to or comprises an inverter 7 that is connected to another power socket 9. A controller 13 is connected to the inverter 7, wherein the controller 13 is configured to control the inverter 7 and thus the power output of the combination of the electric source 6 and the inverter 7. The electric source 6 is configured to supply an electricity feed to electric circuit 5. Furthermore, the controller 13 is connected to a computer 2, wherein the computer 2 is configured to send control signals to the controller 13, which enable the controller to control the electricity feed of the electric source 6 into the electric circuit 5. The connection can be established by wire but also wirelessly. Communication with the controller 13 is checksum-secured.

The external electricity grid 12 provides the electric circuit 5 with electricity. The power consumption is metered with a mains connection meter 4 that determines a power or a current provided to the electric circuit 5. The power is provided in three lines L1, L2, L3 with shifted phase and a PE line PEN.

There is a variety of different kinds of mains connection meters 4 available. Some mains connection meters 4 are based on a turning wheel. Each turn of the wheel indicates a certain amount of electricity provided to the electric circuit 5, wherein the predefined amount of electricity is for example 375 turns per kilowatt (which corresponds to 2.67 W/turn) or 2000 turns per kilowatt (which corresponds to 0.5 W/turn).

Therefore, the duration of a turn depends on the electricity load on the electric circuit 5. This means that a reading of the provided electricity, which is based on the determination of a completed turn, happens in sporadic time intervals whose duration cannot be predicted accurately.

On the other hand, there are modern, so-called smart meters which allow an electricity reading at any time and also for fixed time intervals.

The system 1 according to the invention comprises an electricity load sensor 3, connected to the electric circuit 5 that allows the estimation of the provided electricity to the electric circuit 5 on the load side.

The electricity load sensor 3 can be realised as a device attached to a mains connection meter (see c.f. FIG. 3) with a turning wheel, wherein the electricity load sensor records the turns of the wheel and provides a signal to the computer 2 each time a turn is completed. By additionally providing the amount of electricity per turn of the meter to the computer 2, the electricity load on the electric circuit 5 from the elapsed time interval (between two signals) can be determined by the computer 2. Modern meters 4 have integrated electricity load sensors 3 or provide in regular intervals the provided amount of electricity. In this case, the computer can be directly attached to the meter. However, a connection via internet or another network is possible as well (see c.f. FIG. 1). The electricity load on the electric circuit 5 can be determined by the computer 2 in regular intervals or even continuously, when a modern or a smart-meter is used.

Alternatively, the electricity load can be estimated by a current clamp 3 (see c.f. FIG. 2). In this embodiment, the electricity load sensor 3 is the current clamp attached to a wire (L1, L2 or L3) of the electricity circuit 5 (two alternative locations of the current clamp are shown in FIG. 2, however only one has to be realized). This embodiment also allows a determination of the electric load in regular time intervals.

Depending on the kind of electricity load sensor 3 the computer 2 will estimate an electric feed that can be safely provided to the electric circuit 5 without overloading the electric circuit 5 based on the determined electricity load on the electric circuit 5.

However, it is only possible to determine the electric load from a past time point. Therefore, the computer 2 determines the electricity feed with an associated feed duration. The feed duration corresponds to a time point at which the temperature of the electric circuit 5 would have reached a predefined temperature, for PVC insulated wires 70° C., in case the electricity load on the electric circuit 5 would increase to its maximum (that corresponds to the nominal current of the fuse 11) right after the electricity load has been determined by the computer 2.

At 70° Celsius the plasticisers of the wires and other components of the electric circuit 5 start taking damage.

According to the invention, the computer controls the electricity feed such that a maximum electricity feed can be fed into the electric circuit 5 while the electric circuit reserve is never exceeded, i.e. the predefined maximum temperature is not exceeded.

For this reason the computer 2 is configured to send control signals to the controller 13 that in turn is controlling the feed duration received from the computer 2 autonomously until a new feed duration and a new electricity feed are received from the computer 2.

In case the feed duration has expired and no new data from the electricity load sensor 3 has been provided to the computer 2, the electricity feed will be reduced to a minimal electricity feed according to the generally recognized rules of the technology by the controller 13.

Within this limit of the minimal electricity feed, the temperature will never exceed 70° but the circuit will most likely will cool down.

The electric circuit 5 is secured by a fuse 11 with a nominal current.

The electric reserve can be estimated from installation parameters such as the nominal current of the fuse 11, the type of wall in which the wires of the electric circuit 5 are arranged, the type of fuse and/or the number of fuses.

The electric reserve of the electric circuit 5 is often times higher than the nominal current of the fuse 11. For example, if the wires of the electric circuit 5 are installed in a concrete wall, a current of 22.5 Ampere can be applied to the wires with the temperature of the wires never exceed 70° C.

Therefore, if the fuse 11 has a nominal current of 16 A, even on full load on the electric circuit 5, i.e. 16 Ampere are provided to electricity consuming appliances, there is still 6.5 A reserve of the electric circuit 5 that can be permanently used for the electricity feed of the electric source 6.

In case a higher electricity feed is provided to the electric circuit 5, the circuit 5 will heat up with time. The time it takes to heat up above the predefined temperature of 70° C. depends on the magnitude of the electricity feed and can be estimated by the computer 2.

In another case, where the walls are dry walls, the permanent reserve of the wires is only 15.5 Ampere which is even lower than a potential nominal current of the fuse. Therefore, the permanent reserve of the electric circuit is 0 Ampere, which means under full load no additional electricity can be fed into the electric circuit.

This situation is considerably improved by the system 1 and the method according to the invention. Here, the electricity load is determined (at least for a past interval) and based on the electricity load, the electricity feed and an associated feed duration is determined, wherein the electricity feed is particularly using the full available electricity circuit reserve. By providing the feed duration, it is ensured that the electric circuit 5 cannot overheat, i.e. heating up more than 70° C.

In most cases however, a new electric load is determined before the feed duration expires. Then, the electricity feed does not need to be reduced to the minimum but can be recalculated based on the latest reading of the electricity load. Also a new associated feed duration will be determined based on the latest reading of the electricity load.

This way, the system 1 and method is updating its status repeatedly, while maintaining a failsafe operation mode that is particularly ensuring that, if for example a communication between the computer and any of the other components is broken or malfunctioning, the electric circuit is not overheating, as the system falls back to a safe operating state after the latest determined feed duration has expired.

If, additionally to the electricity load, also the temperature of the electric circuit 5 is estimated, the calculation of the electricity feed and the feed duration can account also for the temperature of the electric circuit 5. If a temperature reading is not available a more conservative approach for calculating the electricity feed and duration has to be chosen.

The temperature of the electric circuit 5 can be recursively estimated by measuring the surrounding temperature of the electric circuit and assuming an initial temperature of the electric circuit of 70°. The method and the system 1 will then calculate based on material constants and dissipation characteristics of the electric circuit 5 the electricity feed and its associated duration as well as the temperature of the electric circuit 5 each time a new electricity load (and the surrounding temperature) is provided.

Therefore, the initially assumed electric circuit temperature of 70° C., will successively reach an actual electric circuit temperature.

The temperature of the surrounding can be determined with a temperature sensor 10.

The invention claimed is:

1. A method for controlling an electricity feed from a load side of an electric circuit (5) to an electricity grid (12), comprising the steps of:
   determining at least one installation parameter of the electric circuit (5);
   determining repeatedly an electricity load on the load side of the electric circuit (5), wherein each time the electricity load is determined, the following steps are executed:
   (i) determining with a computer an information on an electricity feed and an associated feed duration based on the at least one installation parameter and the electricity load, such that a temperature of the electric circuit (5) remains below a predefined maximum temperature during the feed duration;
   (ii) providing the information on the electricity feed with the associated feed duration from the computer to a controller (13) of an electric power converter (7), wherein the controller comprises a timer;
   (iii) the controller (13) commissioning the electric power converter (7) to provide the electricity feed, until one of the following conditions are met:
   the information on the electricity feed and the associated feed duration are provided anew by the computer or the associated feed duration expires,
   wherein in case the associated feed duration expires, the electricity feed is reduced to a minimum electricity feed to prevent an overheating of the electric circuit.

2. The method according to claim 1, wherein the at least one installation parameter is
   a nominal current of a fuse (11) protecting the electric circuit (5);
   a maximum contact load;
   a maximum wire load;
   a type of wall of a facility comprising the electric circuit (5);
   a kind of fuse; and/or
   a number of fuses for the electric circuit (5).

3. The method according to claim 1, wherein a temperature is determined repeatedly or continuously, wherein the information on the electricity feed and the feed duration are determined also based on the temperature.

4. The method according to claim 3, wherein the temperature is an electric circuit temperature.

5. The method according to claim 4, wherein the electric circuit temperature is estimated recursively from a surrounding temperature of the electric circuit, the electricity load on the load side of the electric circuit (5), a currently fed electricity feed and the at least one installation parameter.

6. The method according to claim 1, wherein the electricity load is estimated as an electric current load or an electric power load, wherein the electric current load is particularly determined from the electric power load, particularly from an effective power load, particularly assuming a phase angle between the electric current and the electric voltage such that the modulus of the cosine of the phase angle is not less than a predefined phase shift value.

7. The method according to claim 1, wherein the electricity load is determined for elapsed time intervals, wherein within each elapsed time interval, a predefined amount of electricity has been supplied to the load side of the electric circuit (5), wherein at the end of each time interval the electricity load is determined.

8. The method according to claim 1, wherein the electricity load is determined for elapsed time intervals, wherein the time intervals are spaced regularly and the electricity load is determined at the end of each time interval, particularly wherein the electricity load is determined from a mains connection meter (4) reading or from a mains connection measurement with a current clamp (3).

9. A system for controlling an electricity feed of an electric source comprising:
   an electric power converter (7);
   a controller (13), for controlling an electricity feed from the electric power
   converter (7) to an electric circuit (5);
   the controller (13) comprising a data storage and a timer;
   a computer (2) connected to the controller (13) and configured to provide information on an electricity feed and an associated feed duration to the controller (13);
   wherein the controller (13) is configured to repeatedly receive an information on the electricity feed and the associated feed duration from the computer (2) and to store the information on the data storage;
   wherein the controller (13) is further configured to commission the electric power converter (7) to provide the electricity feed and wherein the controller (13) is further configured to commission the electric power converter (7) to autonomously end the electricity feed in case the feed duration is expired even in the absence of a stop-signal or an updated information on the feed duration provided by the computer, such that a fail-safe operation mode is maintained that prevents overheating of the electric circuit in case the computer or a communication between the computer and the controller breaks down.

10. The system (1) according to claim 9, wherein the system (1) further comprises:
the electric circuit (5) secured with a fuse (11);
an electricity source (6) connected to the electric power converter (7), wherein the electric power converter (7) is connected to the load side of the electric circuit (5) that is secured by the fuse (11);
an electricin load sensor (3) arranged for recording data on an electricity load of the electric circuit (5);
wherein the computer (2) is further connected to the electricity load sensor (3), wherein the computer (2) is configured to:
(i) determine an electricity load on the electric circuit (5) from the recorded data provided by the electricity load sensor (3);
(ii) determine the information on the electricity feed and the associated feed duration from the determined electricity load;
(iii) provide the information on the electricity feed and the feed duration to the controller (13).

11. The system (1) according to claim 10, wherein the electricity load sensor (3) is a current clamp.

12. The system (1) according to claim 10, wherein the electricity load sensor (3) is arranged at or in a mains connection meter (4), wherein the electricity load sensor (3) either provides a power reading of the mains connection meter (4), or wherein the electricity load sensor (3) provides a signal to the computer (2) each time a predefined amount of electricity has been provided to the load side of the electric circuit (5).

13. The system (1) according to claim 9, wherein the system (1) comprises a temperature sensor (10) arranged and configured for measuring the surrounding temperature of the electric circuit (5), wherein the temperature sensor (10) is connected to the computer (2).

14. The method according to claim 1 wherein the method is executed on a system according to claim 9.

* * * * *